United States Patent
Martin

(10) Patent No.: US 7,464,300 B2
(45) Date of Patent: Dec. 9, 2008

(54) METHOD, APPARATUS AND SYSTEM TO DETECT AND SIGNAL SEQUENTIAL HOT PLUG FAILURE DIAGNOSTICS

(75) Inventor: Peter N. Martin, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 491 days.

(21) Appl. No.: 11/013,018

(22) Filed: Dec. 14, 2004

(65) Prior Publication Data

US 2006/0156174 A1    Jul. 13, 2006

(51) Int. Cl.
*G06F 11/00* (2006.01)
(52) U.S. Cl. ....................................... 714/43
(58) Field of Classification Search ........................ None
See application file for complete search history.

(56) References Cited

U.S. PATENT DOCUMENTS

| | | | |
|---|---|---|---|
| 5,687,388 A * | 11/1997 | Wooten et al. | 710/3 |
| 6,009,488 A | 12/1999 | Kavipurapu | |
| 6,834,363 B2 * | 12/2004 | Austen et al. | 714/44 |
| 6,915,446 B2 * | 7/2005 | Riley | 714/5 |
| 7,203,786 B2 * | 4/2007 | Martin | 710/302 |
| 2002/0178404 A1 * | 11/2002 | Austen et al. | 714/43 |
| 2002/0194548 A1 * | 12/2002 | Tetreault | 714/43 |
| 2003/0070111 A1 * | 4/2003 | Riley | 714/5 |
| 2005/0149657 A1 * | 7/2005 | Martin et al. | 710/302 |
| 2005/0149658 A1 * | 7/2005 | Martin et al. | 710/302 |
| 2006/0075153 A1 * | 4/2006 | Martin | 710/15 |
| 2007/0038793 A1 * | 2/2007 | Wehage et al. | 710/305 |

OTHER PUBLICATIONS

Microsoft Computer Dictionary, Microsoft Press, 4th Ed., 1999, p. 224.*

* cited by examiner

*Primary Examiner*—Christopher S McCarthy
(74) *Attorney, Agent, or Firm*—David L. Guglielmi

(57) ABSTRACT

In some embodiments, a method, apparatus and system to detect and signal sequential hot plug failure diagnostics are presented. In this regard, a diagnostic agent is introduced to store a plurality of bits corresponding to a hot plug error code in a register sequentially such that a plurality of hot plug error codes can be stored in the register. Other embodiments are also disclosed and claimed.

11 Claims, 2 Drawing Sheets

METHOD, APPARATUS AND SYSTEM TO DETECT AND SIGNAL SEQUENTIAL HOT PLUG FAILURE DIAGNOSTICS

FIELD OF THE INVENTION

Embodiments of the present invention generally relate to the field of component signaling, and, more particularly to a method, apparatus and system to detect and signal sequential hot plug failure diagnostics.

BACKGROUND OF THE INVENTION

Debugging and diagnosing system failures can be very time consuming and difficult. Furthermore, it is often necessary to use sophisticated equipment such as a logic analyzer which can be prohibitively expensive to acquire.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention are generally directed to a method, apparatus and system to detect and signal sequential hot plug failure diagnostics. In this regard, in accordance with but one example implementation of the broader teachings of the present invention, a diagnostic agent is introduced. In accordance with but one example embodiment, the diagnostic agent employs an innovative method to store a plurality of bits corresponding to a hot plug error code in a register sequentially such that a plurality of hot plug error codes can be stored in the register. According to one example method, the diagnostic agent makes an error status register accessible to software debug programs. According to another example method, the diagnostic agent stores simultaneously occurring error codes adjacent to one another along with an indication that the errors occurred simultaneously.

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
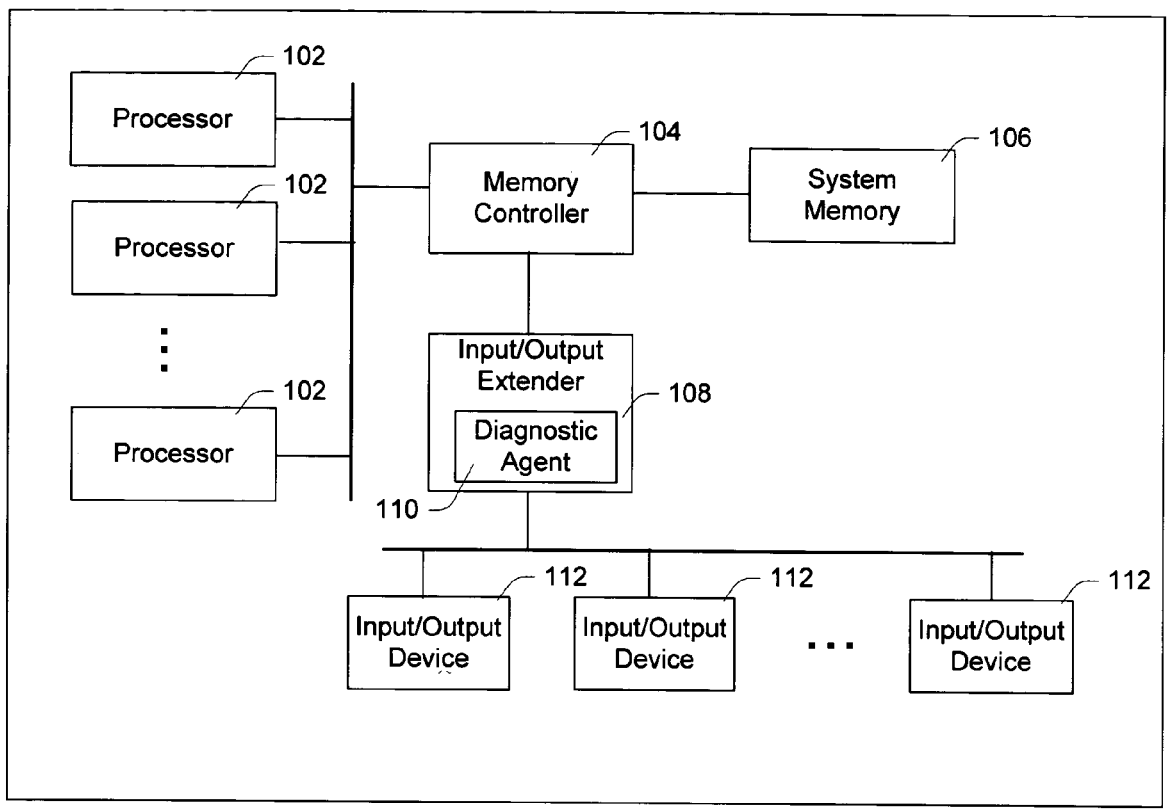
FIG. 1 is a block diagram of an example electronic appliance suitable for implementing a diagnostic agent, in accordance with one example embodiment of the invention.

FIG. 1 is a block diagram of an example electronic appliance suitable for implementing a diagnostic agent, in accordance with one example embodiment of the invention. Electronic appliance 100 is intended to represent any of a wide variety of traditional and non-traditional electronic appliances, laptops, desktops, cell phones, wireless communication subscriber units, wireless communication telephony infrastructure elements, personal digital assistants, set-top boxes, or any electric appliance that would benefit from the teachings of the present invention. In accordance with the illustrated example embodiment, electronic appliance 100 may include one or more of processor(s) 102, memory controller 104, system memory 106, input/output extender 108, diagnostic agent 110, and input/output device(s) 112 coupled as shown in FIG. 1. Diagnostic agent 110, as described more fully hereinafter, may well be used in electronic appliances of greater or lesser complexity than that depicted in FIG. 1. Also, the innovative attributes of diagnostic agent 110 as described more fully hereinafter may well be embodied in any combination of hardware and software.

Processor(s) 102 may represent any of a wide variety of control logic including, but not limited to one or more of a microprocessor, a programmable logic device (PLD), programmable logic array (PLA), application specific integrated circuit (ASIC), a microcontroller, and the like, although the present invention is not limited in this respect.

Memory controller 104 may represent any type of chipset or control logic that interfaces system memory 106 with the other components of electronic appliance 100. In one embodiment, the connection between processor(s) 102 and memory controller 104 may be referred to as a front-side bus. In another embodiment, memory controller 104 may be referred to as a north bridge.

System memory 106 may represent any type of memory device(s) used to store data and instructions that may have been or will be used by processor(s) 102. Typically, though the invention is not limited in this respect, system memory 106 will consist of dynamic random access memory (DRAM). In one embodiment, system memory 106 may consist of Rambus DRAM (RDRAM). In another embodiment, system memory 106 may consist of double data rate synchronous DRAM (DDRSDRAM). The present invention, however, is not limited to the examples of memory mentioned here.

Input/output (I/O) extender 108 may represent any type of chipset or control logic that interfaces I/O device(s) 112 with the other components of electronic appliance 100. In one embodiment, I/O extender 108 may be a 64 bit Peripheral Component Interconnect (PCI) hub. In one embodiment, I/O extender 108 functions as a bridge that interfaces with memory controller 104 using a bus that complies with the PCI Express™ Base Specification, Revision 1.0a, PCI Special Interest Group, released Apr. 15, 2003, and that interfaces with I/O device(s) 112 using one or more busses that comply with the PCI-X Protocol Addendum to the PCI Local Bus Specification, Revision 2.0a, PCI Special Interest Group, released Jul. 22, 2003. In another embodiment, I/O extender 108 may perform at least some of the functionality for electronic appliance 100 to comply with the PCI Standard Hot-Plug Controller (SHPC) and Subsystem Specification, Revision 1.0, PCI Special Interest Group, released Jun. 20, 2001, which allows PCI card (i.e. I/O device(s) 112) removal, replacement, and addition without powering down electronic appliance 100.

Diagnostic agent 110 may have an architecture as described in greater detail with reference to FIG. 2. Diagnostic agent 110 may also perform one or more methods to detect and signal sequential hot plug failure diagnostics, such as the method described in greater detail with reference to FIG. 3. While shown as being part of I/O extender 108, diagnostic agent 110 may well be part of another component, for example processor(s) 102 or another discrete component, or may be implemented in software or a combination of hardware and software.

Input/output (I/O) device(s) 112 may represent any type of device, peripheral or component that provides input to or processes output from electronic appliance 100. In one embodiment, though the present invention is not so limited, I/O device(s) 112 may comply with the PCI-X Protocol Addendum to the PCI Local Bus Specification, Revision 2.0a, PCI Special Interest Group, released Jul. 22, 2003.

Figure 2:
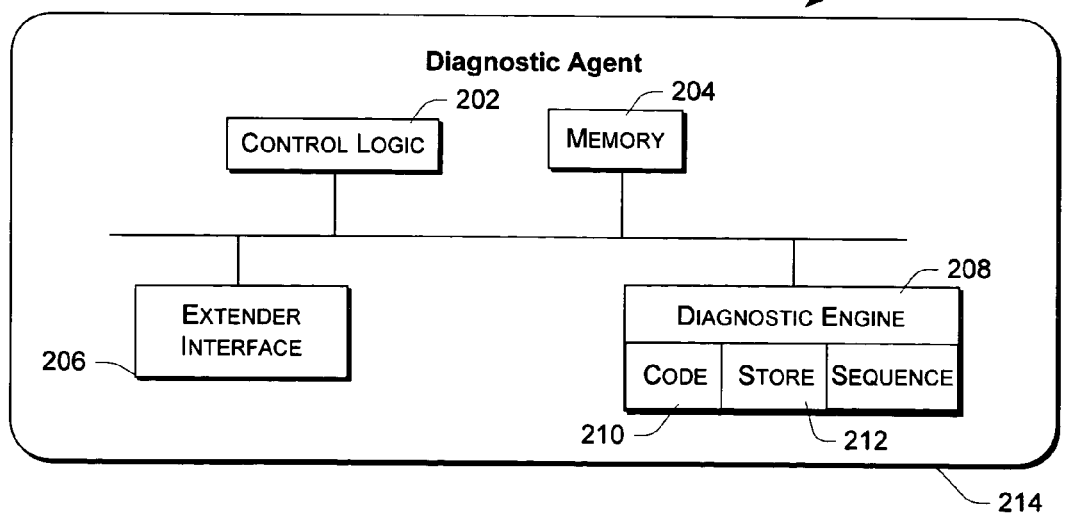
FIG. 2 is a block diagram of an example diagnostic agent architecture, in accordance with one example embodiment of the invention.

FIG. 2 is a block diagram of an example diagnostic agent architecture, in accordance with one example embodiment of the invention. As shown, diagnostic agent 110 may include one or more of control logic 202, memory 204, extender interface 206, and diagnostic engine 208 coupled as shown in FIG. 2. In accordance with one aspect of the present invention, to be developed more fully below, diagnostic agent 110 may include a diagnostic engine 208 comprising one or more of code services 210, store services 212, and/or sequence services 214. It is to be appreciated that, although depicted as a number of disparate functional blocks, one or more of elements 202-214 may well be combined into one or more multi-functional blocks. Similarly, diagnostic engine 208 may well be practiced with fewer functional blocks, i.e., with only store services 212, without deviating from the spirit and scope of the present invention, and may well be implemented in hardware, software, firmware, or any combination thereof. In this regard, diagnostic agent 110 in general, and diagnostic engine 208 in particular, are merely illustrative of one example implementation of one aspect of the present invention. As used herein, diagnostic agent 110 may well be embodied in hardware, software, firmware and/or any combination thereof.

As introduced above, diagnostic agent 110 may have the ability to store a plurality of bits corresponding to a hot plug error code in a register sequentially such that a plurality of hot plug error codes can be stored in the register. In one embodiment, diagnostic agent 110 may make an error status register accessible to software debug programs. In another embodiment, diagnostic agent 110 stores simultaneously occurring error codes adjacent to one another along with an indication that the errors occurred simultaneously.

As used herein control logic 202 provides the logical interface between diagnostic agent 110 and its host electronic appliance 100. In this regard, control logic 202 may manage one or more aspects of diagnostic agent 110 to provide a communication interface to electronic appliance 100, e.g., through I/O extender 108.

According to one aspect of the present invention, though the claims are not so limited, control logic 202 may selectively invoke the resource(s) of diagnostic engine 208. As part of an example method to detect and signal sequential hot plug failure diagnostics, as explained in greater detail with reference to FIG. 3, control logic 202 may selectively invoke code services 210 that may identify a hot plug error code. Control logic 202 also may selectively invoke store services 212 or sequence services 214, as explained in greater detail with reference to FIG. 3, to store the error code or sequence multiple error codes, respectively. As used herein, control logic 202 is intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like. In some implementations, control logic 202 is intended to represent content (e.g., software instructions, etc.), which when executed implements the features of control logic 202 described herein.

Memory 204 is intended to represent any of a wide variety of memory devices and/or systems known in the art. According to one example implementation, though the claims are not so limited, memory 204 may well include volatile and non-volatile memory elements, possibly random access memory (RAM) and/or read only memory (ROM). In one embodiment, memory 204 may include one or more registers, for example 32 bit registers, to store error codes sequentially. The contents of the error status register(s) may be accessible to software debug programs running on processor(s) 102.

Extender interface 206 provides a path through which diagnostic agent 110 can communicate with I/O extender 108. In one embodiment, extender interface 206 may represent any of a wide variety of controllers known in the art. In another embodiment, extender interface 206 may comply with the System Management Bus (SMBus) Specification, Version 2.0, SBS Implementers Forum, released Aug. 3, 2000.

As introduced above, diagnostic engine 208 may be selectively invoked by control logic 202 to identify a hot plug error code, to store the hot plug error code, or to sequence multiple error codes. In accordance with the illustrated example implementation of FIG. 2, diagnostic engine 208 is depicted comprising one or more of code services 210, store services 212 and sequence services 214. Although depicted as a number of disparate elements, those skilled in the art will appreciate that one or more elements 210-214 of diagnostic engine 208 may well be combined without deviating from the scope and spirit of the present invention.

Code services 210, as introduced above, may provide diagnostic agent 110 with the ability to identify the occurrence of a hot plug error and an associated error code. In one example embodiment, code services 210 may use unique five or six bit long error codes that are hardwired or stored in a look-up table. There are many possible failure modes of the SHPC, including for example, illegal access protocols to SHPC memory space and indeterminate slot status encoding.

As introduced above, store services 212 may provide diagnostic agent 110 with the ability to store error codes. In one embodiment, store services 212 is able to store at least five error codes before running out of available storage. After running out of available storage, store services 212 may overwrite previously stored error codes.

Sequence services 214, as introduced above, may provide diagnostic agent 110 with the ability to sequence multiple error codes. In one example embodiment, store services 212 may maintain a pointer to determine where in memory or in a register an error code should be stored. In one embodiment, sequence services 214 may identify when multiple errors occur simultaneously and store an indication that the errors occurred simultaneously. In another example embodiment, sequence services 214 may store simultaneously occurring error codes in a separate register or may store an additional bit in the error status register.

Figure 3:
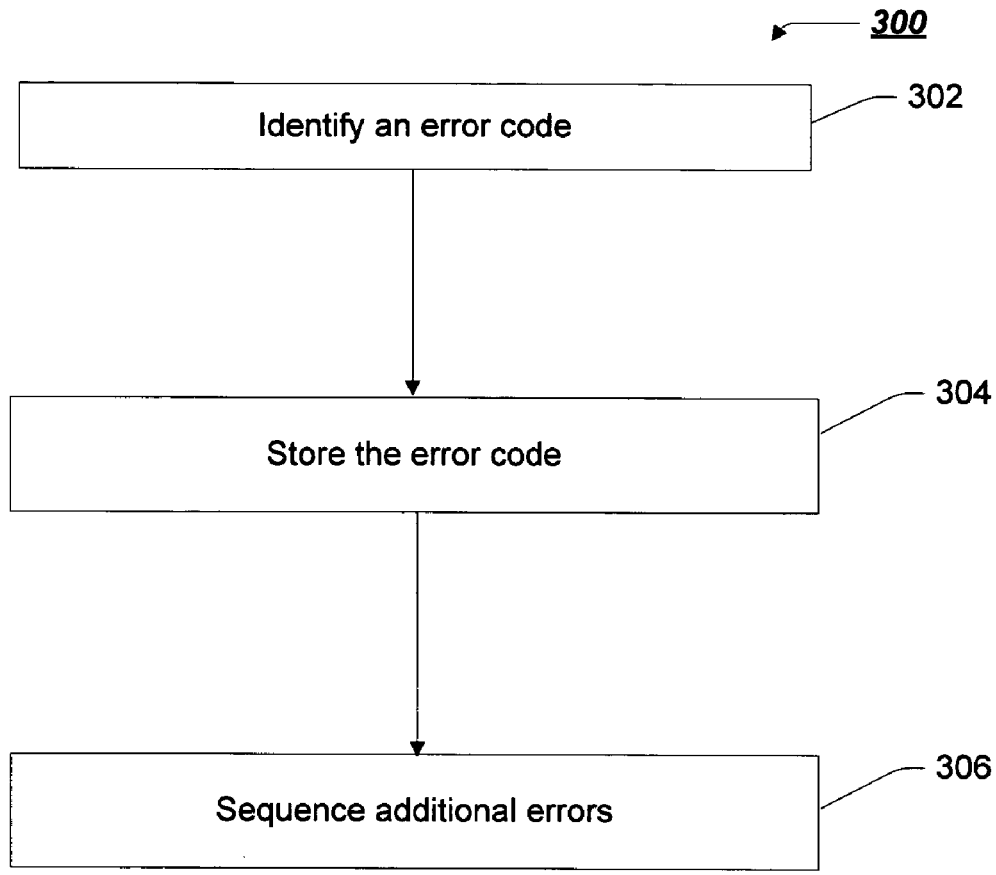
FIG. 3 is a flow chart of an example method to detect and signal sequential hot plug failure diagnostics, in accordance with one example embodiment of the invention.

FIG. 3 is a flow chart of an example method to detect and signal sequential hot plug failure diagnostics, in accordance with one example embodiment of the invention. It will be readily apparent to those of ordinary skill in the art that although the following operations may be described as a sequential process, many of the operations may in fact be performed in parallel or concurrently. In addition, the order of the operations may be re-arranged without departing from the spirit of embodiments of the invention.

According to but one example implementation, method 300 begins with code services 210 being invoked to identify (302) an error code after the occurrence of a hot plug error. In one example embodiment, code services 210 may identify a five bit error code from a hard-wired table. In another example embodiment, code services 210 may identify the error code from a non-volatile memory look-up table.

Next, control logic 202 may selectively invoke store services 212 to store (304) the error code. In one example embodiment, store services 212 may store the error code in a register in memory 204. In another example embodiment, store services 212 may overwrite old error codes.

Next, sequence services 214 may sequence (306) additional errors. In one embodiment, a pointer maintained by sequence services 214 provides the location to which store services 212 stores the error code. In another embodiment, simultaneous error codes may be stored adjacently in a register with a one bit indication that they occurred simultaneously.

Figure 4:
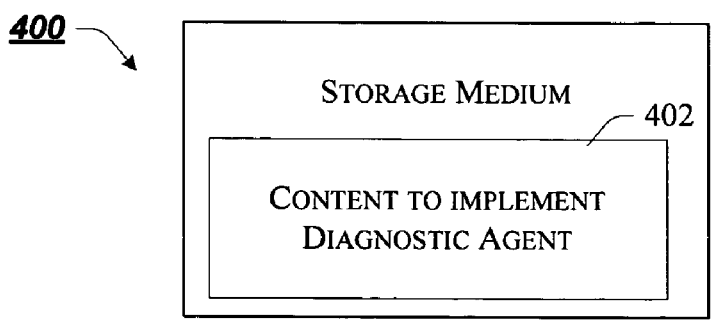
FIG. 4 is a block diagram of an example storage medium comprising content which, when accessed by a device, causes the device to implement one or more aspects of one or more embodiment(s) of the invention.

FIG. 4 illustrates a block diagram of an example storage medium comprising content which, when accessed by a device, causes the device to implement one or more embodiment(s) of the invention, for example diagnostic agent 110 and/or associated method 300. In this regard, storage medium 400 includes content 402 (e.g., instructions, data, or any combination thereof) which, when executed, causes the appliance to implement one or more aspects of diagnostic agent 110, described above.

The machine-readable (storage) medium 400 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may be used in a variety of applications. Although the present invention is not limited in this respect, the invention disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

Many of the methods are described in their most basic form but operations can be added to or deleted from any of the methods and information can be added or subtracted from any of the described messages without departing from the basic scope of the present invention. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
    storing a plurality of bits corresponding to a hot plug error code in a register sequentially such that a plurality of hot plug error codes can be stored in the register; and
    storing a plurality of bits corresponding to simultaneously occurring error codes and an indication that the errors occurred simultaneously in the register.

2. The method of claim 1, wherein the hot plug error code comprises a code associated with an error as defined in a Peripheral Component Interconnect (PCI) Standard Hot-Plug Controller (SHPC) and Subsystem Specification.

3. The method of claim 1, wherein the register comprises a 32 bit register.

4. The method of claim 1, wherein the register comprises a register capable of storing at least 5 error codes sequentially.

5. A storage medium comprising content which, when executed by the accessing machine, causes the accessing machine to store a plurality of bits corresponding to a hot plug error code in a register sequentially such that a plurality of hot plug error codes can be stored in the register, and to store a plurality of bits corresponding to simultaneously occurring error codes and an indication that the errors occurred simultaneously in the register.

6. The storage medium of claim 5, wherein the hot plug error code comprises a code associated with an error contemplated by a Peripheral Component Interconnect (PCI) Standard Hot-Plug Controller (SHPC) and Subsystem Specification.

7. The storage medium of claim 5, wherein the register comprises a register capable of storing at least 5 error codes sequentially.

8. An apparatus, comprising:
- a Peripheral Component Interconnect (PCI) Express interface, for the apparatus to
- communicate with a chipset;
- a PCI-X interface, for the apparatus to communicate with peripheral devices; and
- control logic coupled with the PCI Express and PCI-X interfaces, the control logic to store a plurality of bits corresponding to a hot plug error code in a register sequentially such that a plurality of hot plug error codes can be stored in the register, and the control logic to store a plurality of bits corresponding to simultaneously occurring error codes and an indication that the errors occurred simultaneously in the register.

9. The apparatus of claim 8, wherein the hot plug error code comprises a code associated with an error within a PCI Standard Hot-Plug Controller (SHPC) and Subsystem Specification.

10. The apparatus of claim 8, wherein the register comprises a 32 bit register.

11. The apparatus of claim 8, wherein the apparatus is a PCI hub.

* * * * *